March 1, 1966  F. P. FEHN  3,238,402
ELECTROMAGNETIC CLUTCH
Filed July 26, 1960  3 Sheets-Sheet 1
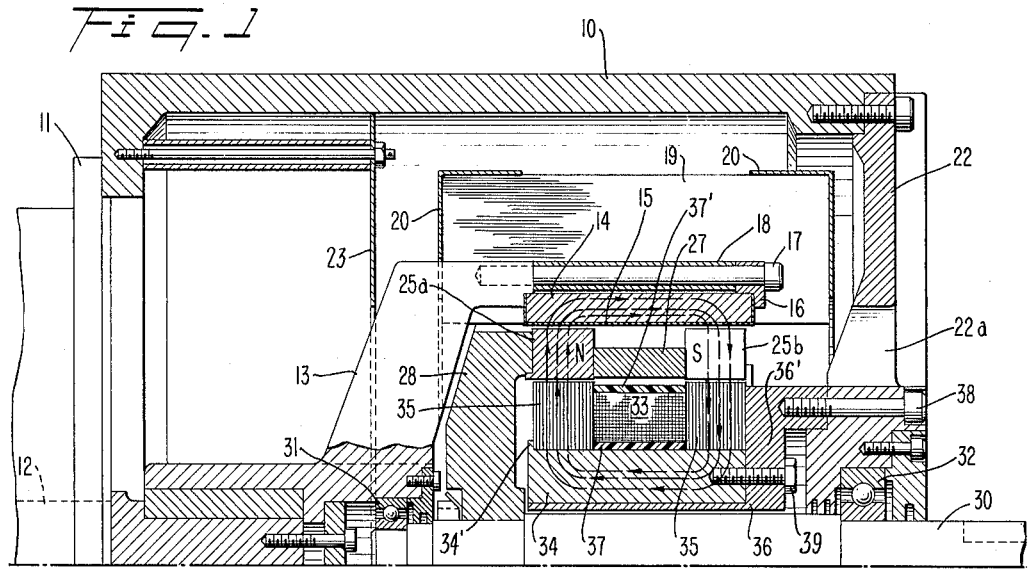
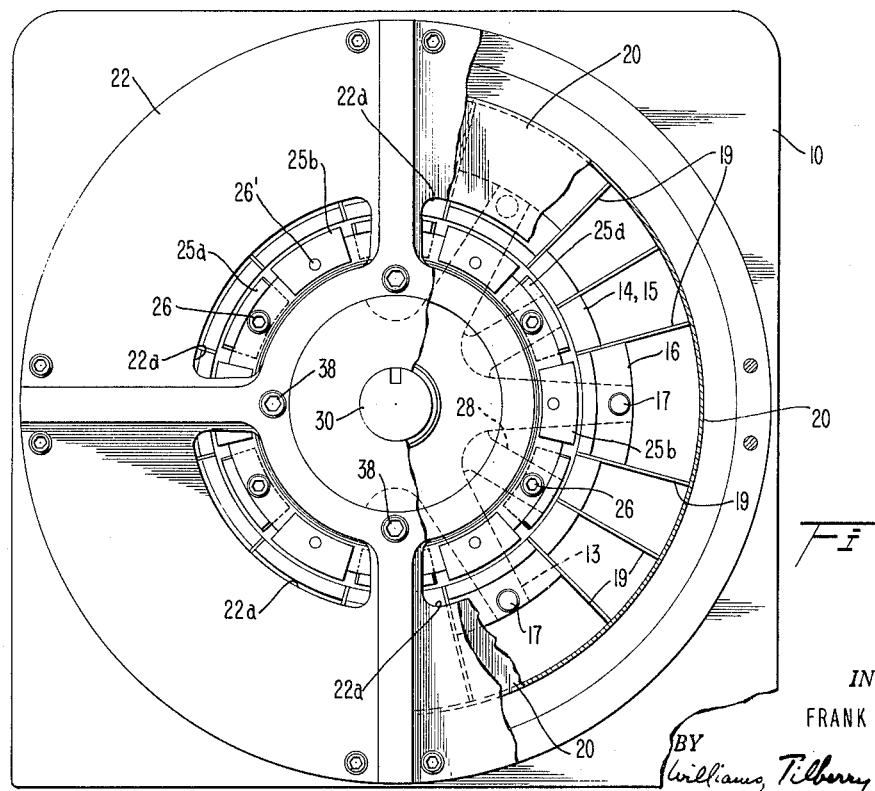
INVENTOR.
FRANK P. FEHN
BY Williams, Tilberry and Golrick
ATTORNEYS

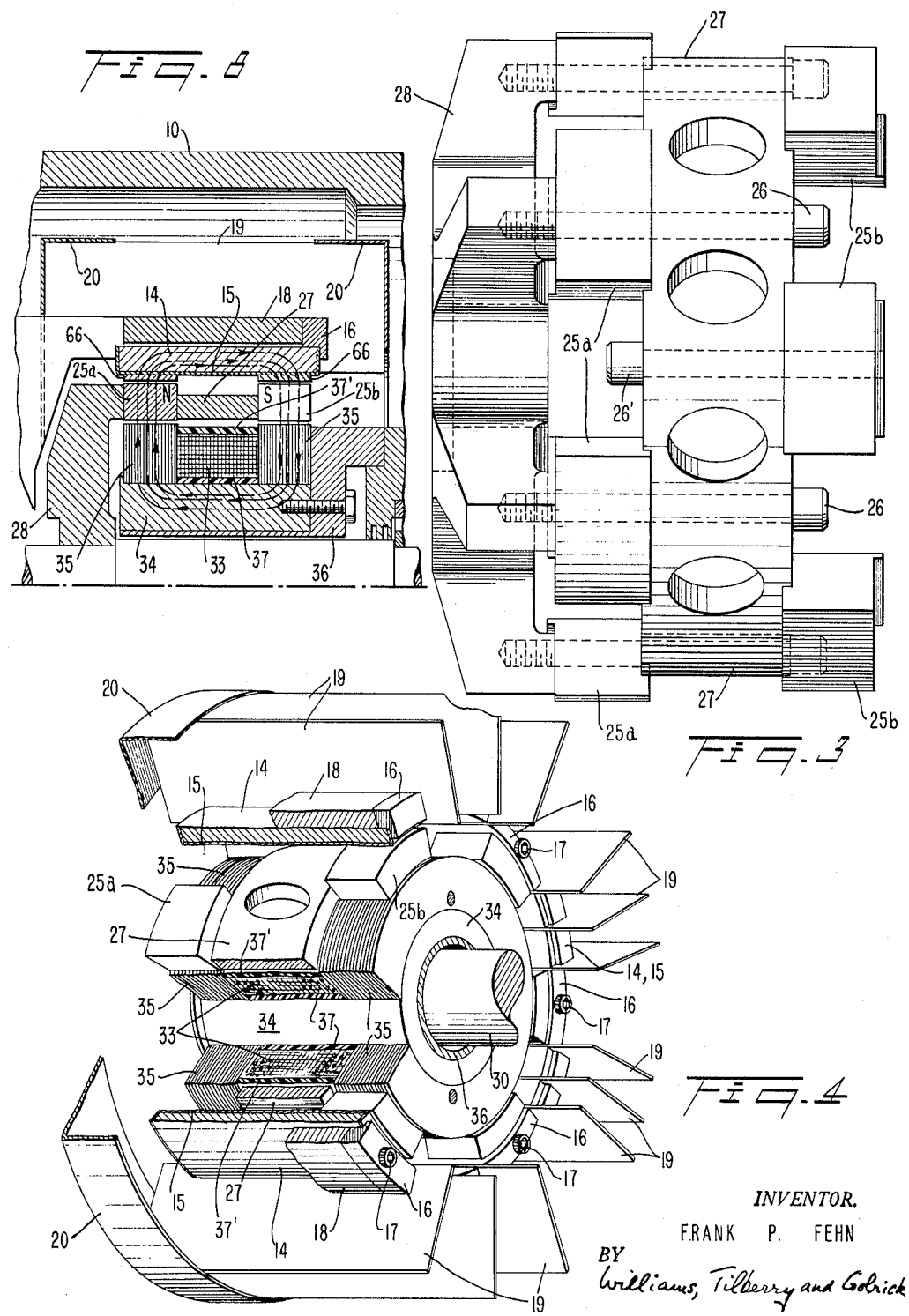

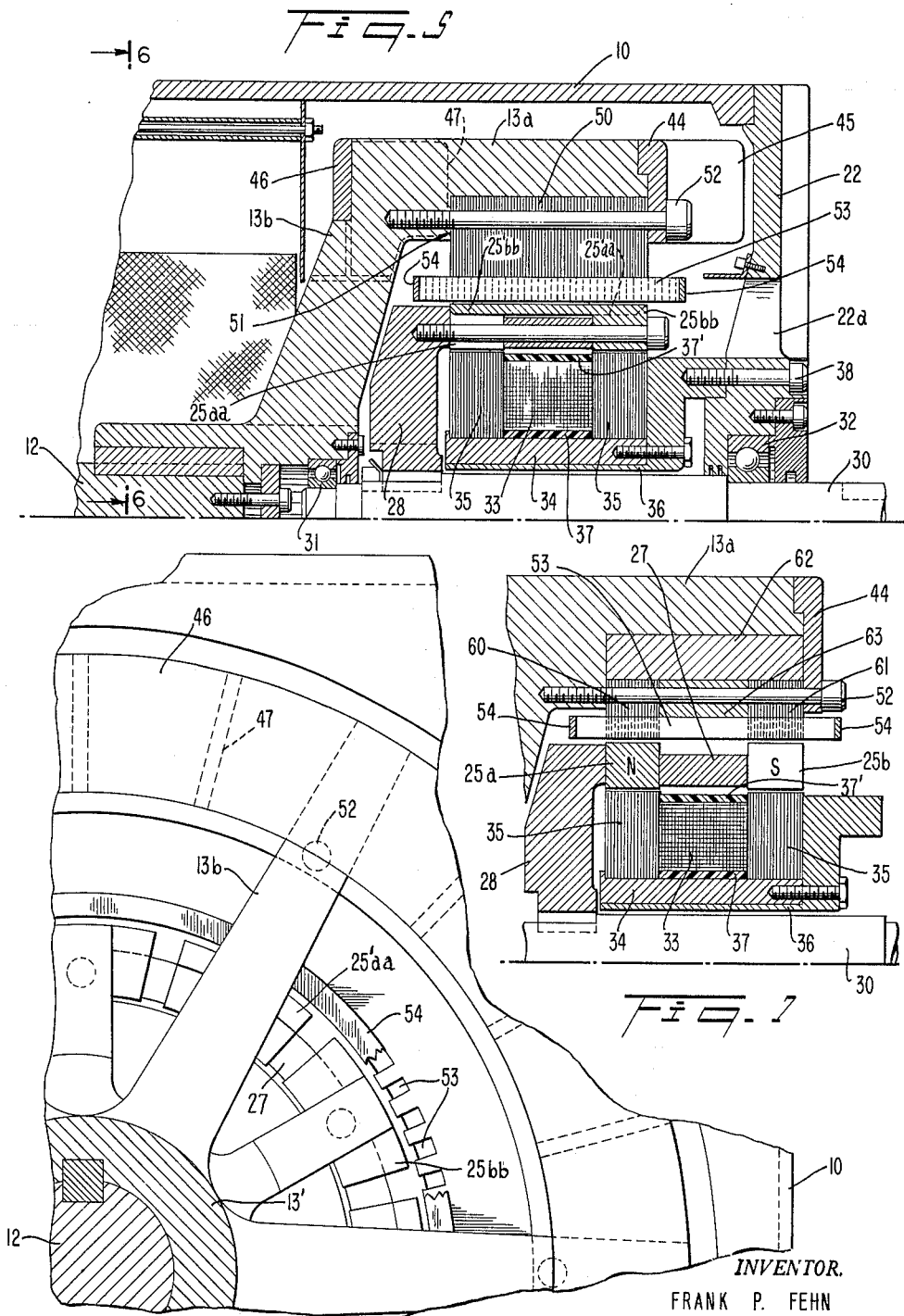

United States Patent Office 3,238,402
Patented Mar. 1, 1966

3,238,402
ELECTROMAGNETIC CLUTCH
Frank P. Fehn, Canton, Ohio, assignor to E. W. Bliss Company, Canton, Ohio, a corporation of Delaware
Filed July 26, 1960, Ser. No. 45,348
5 Claims. (Cl. 310—105)

This invention relates to electric, magnetic slip clutches involving inductively linked rotary coaxial driving and driven members of which the driven member may be a motion transmitting follower or output member or a motion or force absorption member.

The general object of the invention is to provide improvements in such clutches for investing them with superior torque and response factors. The invention features improved constructions and combinations of clutch parts and materials for utilizing and directing field flux internally and across the gap between the input or driving member and the output or driven member with maximum working effect.

An object of the invention is to provide an arrangement of magnetic poles or flux concentrators for extending alternate magnetic fields between driving and driven members of a magnetic slip clutch with minimum flux leakage and optimum torque effect. More specifically, as provided by the invention, two circular arrays or series of flux poles, each series of different magnetic polarity, are so relatively circumferentially offset as to produce optimum magnetic inductive force between the clutch members. Specifically, two such arrays of flux poles are peripherally provided at axial spacing upon one of the coaxial driving and driven members, with the poles in one array having circumferential positions within its array staggered or alternating relative to the circumferential positions of the poles within the other array. Through such alternating circumferential disposition of flux poles in two circular pole arrays of relatively opposite polarity on one of the clutch members, the magnetic flux sweeps and alternations induced in the other member are increased in frequency without reduction of flux change or sweep between adjacent poles of either series, with consequent optimum torque effect between the members and with smooth-curve response of the driven member to change in slip speed of the driving member.

Another object of the invention is to provide the magnetic slip clutch with a novel cylindrical composite inductor member. In one form of the invention, the composite induction member includes rings of different material bonded together, one material being ferromagnetic and the other having low magnetic permeability, low current resistance and high heat transference. More specifically, this composite inductor member includes an annulus of ferromagnetic material and a thin ring or facing of non-magnetic, metallic material such as copper bonded to a face of the ferromagnetic annulus. Preferably, the copper facing is extended into engagement with the ends of the ferromagnetic annulus for improved cooling effect. To prevent distortion of the non-magnetic, metallic facing due to difference in coefficients of expansion of the non-magnetic, metallic and ferromagnetic materials, the composite inductor ring may be provided, further, according to the invention with ferromagnetic expansion restraining bands for the non-magnetic, metallic ring opposite the orbits of the flux poles on the pole-carrying member of the clutch couple. In another form of the invention, the composite inductor involves a squirrel cage and a laminated carrier therefor. Such laminated carrier may be supplemented, in a modification, by a flux conducting band of ferromagnetic material across the laminations.

Another object of the invention is to provide the magnetic slip clutch with a novel built-up polar member constructed with individual flux poles or pieces of magnetic material and with non-magnetic supporting means for the pole pieces. By reason of such construction, the polar member, which in the specific disclosure is the driven member of the clutch, can be a lightweight structure having a low moment of inertia and rapid responsiveness to changes in field excitation or driver speed. In furtherance of this objective, the individual pole pieces are mounted on lightweight support means of non-magnetic, metallic material such as a suitable stainless steel which will not divert flux from the poles and will at the same time afford structural rigidity to maintain the pole pieces accurately in position. To keep the rotating parts light and at the same time avoid the use of slip rings or commutator bars, a stationary field winding is provided. To subdue eddy currents in the stationary field member and avoid drag between the field member and the adjacent rotating member, the field winding is provided with a laminated yoke. Further, a field winding is provided with a central core of ferromagnetic material to serve as a good conductor for magnetic flux extension through the field yoke to the poles of the adjacent rotative member.

The invention also provides an effective air cooling arrangement for the clutch.

Other objects and advantages reside in novel features of construction and in combinations of features present in the disclosed embodiments of the invention.

In the drawings:

FIG. 1 is a longitudinal sectional view through one half of a first embodiment of the invention, the other half being symmetrical;

FIG. 2 is a view looking at the right hand end of the first embodiment, some parts being broken away to expose other parts;

FIG. 3 is a detail side view of the polar, driven member in the first embodiment;

FIG. 4 is a perspective partly sectional view of associated parts of the first embodiment;

FIG. 5 is a view similar to FIG. 1 but relating to a second embodiment of the invention;

FIG. 6 is a fragmentary vertical section along line 6—6 of FIG. 5;

FIG. 7 is a fragmentary longitudinal sectional view through a modification of the second embodiment; and FIG. 8 is a similar view of a modification of the first embodiment.

Referring to FIGS. 1 and 2, a frame case 10 is rigid with end flange 11 of a motor housing. Motor shaft 12 extends into case 10 for connection with the driving member or driving rotor of the clutch. This driving member includes a spider 13, of non-magnetic steel, secured to the end of the motor shaft. In the first embodiment of the invention, the driving member further includes a composite inductor ring consisting of a machined annulus or circular band 14 of magnetic steel or the equivalent and a comparatively very thin non-magnetic, metallic inductive lining 15 of copper or the equivalent dimensioned to fit against the inner face of the steel annulus and formed with rim flanges engaged with the ends of the steel annulus. The steel annulus 14 and the copper lining 15 are firmly bonded to each other, as by heliarc welding or by brazing. Air cooling means are provided to carry away heat generated during running of the clutch. The cooling means includes the lining 15, which is a good heat conductor, and fan blades 19 (also see FIG. 4), radiating outwardly from the periphery of the composite inductor ring 14–15 and confined between side shrouds 20, the shrouds and fan blades being of copper or equivalent non-magnetic, metallic material and being bonded together and to the inductor ring. Air is inducted through arcuate openings 22a in right hand end frame 22 and carried around by the fan blades and between the side shrouds to an outlet (not shown) in the case 10. A fixed shield 23 inside the case 10 confines the cooling air to the region of the rotary clutch members.

The composite inductor ring 14–15 is in close concentric spacing around the parallel circular orbits of two series of poles 25a and 25b comprising peripheral elements of the driven rotor or member of the clutch shown in FIGS. 1 to 4. The series of poles 25a is attached by non-magnetic tie bolts or cap screws 26 to the left side of a spacer web 27 and the series of poles 25b is attached by non-magnetic bolts or screws 26' to the right side of the web. The screws 26 are longer and thread into the spokes of a spider 28 (see FIG. 3), thus mounting the assembled poles 25a and 25b and the web 27 to the spider 28. Poles 25a and 25b are individual ferromagnetic segments; web 27 is composed of non-magnetic structurally rigid stainless steel perforated to lighten it, and the spider 28 is also of non-magnetic steel and light in weight. The assembly of parts 25a, 25b, 26, 26', 27 and 28 is a comparatively lightweight assembly constituting the driven rotor and has a low moment of inertia. Spider 28 is fixed to output shaft 30 which is in axial alignment with motor shaft 12 and is supported by ball bearings 31 and 32, in the hub of drive spider 13 and in the end frame 22, respectively.

Nested within the inner, driven rotor is a stationary field unit including a winding 33, within inner and outer fiberglass spacer rings 37 and 37', on a spool 34 and between side flanking groups of flat ring-shaped laminations 35, the spool and the laminations being of ferromagnetic material and constituting a core for the winding. The elements 33, 35, 37 and 37' of the field unit are clamped tightly in position between a flange 34' of spool 34 and a flange 36' of a tubular bracket 36 by shoulder screws 39 which also fix the spool 34 to the bracket. The bracket, and screws 39, are of non-magnetic metal so as not to divert flux produced upon excitation of the field winding. The sleeve portion of the bracket surrounds output shaft 30 with adequate clearance, and the bracket flange is attached by cap screws 38 to the central portion of the end frame 22.

Upon excitation of the field unit by D.C. current, it establishes a toroidal magnetic field conducted by the central spool 34 and by the lamination groups 35 to the axially spaced-apart series of poles 25a and 25b which independently extend the magnetic flux to the composite inductor ring 14–15. As indicated in the example shown in FIG. 1, magnetic north polarity is constantly induced in the poles 25a and south polarity in the poles 25b. The flux concentration or density at the poles is a maximum relative to the flux density between the poles of a series. Accordingly, upon relative rotation between the poles and the inductor ring 14–15, currents are induced in the low ohmic resistance copper lining 15 which result in formation of a magnetic field having a low-reluctance path in the ferromagnetic annulus 14. The interaction of the magnetic field resulting from the currents induced in the inductor ring with the magnetic flux bundles at the poles produces driving or linking torque between the inductor ring and the poles, influencing the driven rotor to follow the driving rotor. For a given field excitation and slip speed (relative r.p.m. between the inductor ring and the pole-carrier), the linking torque is proportional to the magnitude of the flux change or sweep from pole to pole of a series and to the rate or frequency at which the flux-sweeps past a given element of the inductor ring.

The shape of the poles and the relative angular widths of the poles and the inter-pole spaces can be designed for optimum flux sweep. Applicant has found that the segmental or arch form of pole and a substantially equal angular width of pole and of inter-pole space is desirable for optimum flux sweep. The number of poles in a circular series and, hence, the angle subtended by each pole and the equal angle subtended by the inter-pole gap, depends on the diameter of the pole orbit. For a pole orbit of approximately 12 inches in diameter, which applies to the illustrated embodiments, the pole and inter-pole gap each subtend an angle of about 30 degrees, and each series therefore has six poles, as shown, and six inter-pole spaces. The rate of pole sweep with respect to each series of poles is, in any case, limited by the number of poles in each series, the number as well as form of the poles being in turn limited by the requirement for maximum flux sweep.

According to the invention, the effective rate of pole sweep is multiplied (doubled) by arranging the poles in each series in circumferential positions staggered or alternating with respect to the circumferential positions of the poles in the axially distant series. By thus staggering the poles 25a relative to the poles 25b, twice as many pole-sweeps act upon a given axially parallel element of the inductor ring 14–15 during a given interval as the number of pole sweeps which would be impressed on the inductor element if the poles of one series were in axially parallel alignment with the poles of the other series. Since the driving or linking torque between the inner rotor including the poles and the outer rotor including the inductor ring is proportional to the rate of pole sweep, the alternating arrangement (which also may be referred to as the lap arrangement) of the poles 25a in one series relative to the poles 25b in the axially distant series, results in multiplication of the linking torque. Further, by reason of this alternating, staggered arrangement of the poles 25a and 25b of respectively opposite magnetic polarity, the air gap between a pole of either series and a pole of the other series is increased and hence flux leakage is minimized. It is to be noted, further, that by reason of the alternating, circumferentially offset relation between the poles 25a and the poles 25b, the flux extending from a pole in one series through a crosswise finite strip of the inductor ring and to an opposite pole in the other series is in an angular or inclined direction, relative to axially parallel direction, during an incremental time interval and is in the reverse angular direction during a next increment of time. Thus, the flux extended by the poles in the axially spaced circumferentially offset series to a crosswise incremental strip of the inductor ring has a circumferential component in one direction at one instant of time and a circumferential component in opposite direction at a next instant of time. Consequently, the current induced in the induction ring continually alternates at high frequency, producing an extremely effective magnetic drag between the polar member and the inductor member. These two main effects, the alternation of induced flux direction and the increase in induced sweep frequency without decrease in flux sweep between adjacent poles of either series, provide optimum linking torque between the driving and driven members and smooth-curve response of the driven member through a large range of slip speeds, from low to high.

Inasmuch as the clutch may be required to operate at high slip and high torque for extended periods, the strong, rapid current changes induced in the induction ring 14–15 generate a substantial amount of heat which has to be dissipated. Not only does the copper facing 15 of the inductor ring provide a low resistance induced current path but it also has high heat transference which in combination with the ventilation means including fan blades 19 provide adequate heat dissipation.

It is to be noted, further, that since the driven rotor, which here carries the poles, is light in weight, it has a low moment of inertia, promoting sensitive response to changes in driving torque resulting from changes in field excitation (below saturation) or to changes in speed of the driving rotor.

Also to be noted is the construction of the field unit to suppress eddy currents therein which would apply undesired drag on the adjacent inner rotor, here the driven rotor. The rotation of the poles 25a and 25b relative to the stationary field unit tends to induce eddy currents in the field unit. By the provision of the lamination groups 35 to extend the field flux to the poles, the creation of eddy currents therein is effectively repressed and hence the stationary field unit exerts no significant drag on the driven rotor. At the same time, the laminations 35 deter lateral straying of flux and provide optimum flux threading, per lamination, in the useful radial direction toward the flux poles 25a and 25b.

Furthermore, although the pole-carrying, low-inertia unit of FIG. 3 has been described as the driven unit, it should be understood that as far as the linking torque between the driving and driven rotors of the clutch is concerned, the pole carrying member could be the driving instead of the driven member, and the inductor ring could be the driven instead of the driving member.

The second embodiment of the invention in a slip clutch is indicated in FIGS. 5 and 6 and differs from the first embodiment mainly in provision of a squirrel-cage inductor instead of the ring inductor 14–15. Elements which are the same in the second as in the first embodiment, ignoring dimensional differences, are given the same reference designations. As in the first embodiment, a stationary field unit 33, 34, 35 is nested within the driven member which here has two axially spaced series of poles 25aa and 25bb with poles 25aa alternating in circumferential positions relative to the poles 25bb, just as poles 25a and 25b of the first embodiment alternate. The non-magnetic driving spider 13' in the second embodiment has axially parallel arms 13a integrally projecting from the outer ends of the spider spokes 13b. A clamp disk 44 has rabbeted fit with the free ends of the arms 13a and carries non-magnetic air-cooling vanes 45. Fitted to the opposite ends of the spider arms is another disk 46, with cooling vanes 47. The disks 44, 46 and vanes 47 are preferably non-magnetic.

Lamination disks 50, of ferromagnetic material, such as transformer steel, are positioned between the clamp disk 44 and radial shoulders 51 formed on the inner faces of the spokes 13b at their junctions with the extended arms 13a. The lamination disks 50 have peripheral engagement with the under-sides of arms 13a and are thereby positioned concentrically about the axis of the input and output shafts 12 and 30. Cap screws 52 preferably of non-magnetic metal hold the clamp disk 44 and the lamination disks 50 in place. The laminations 50 serve as a carrier for a squirrel-cage inductor which comprises axially parallel circumferentially spaced copper bars 53 and copper end rings 54, the bars being suitably made fast to the laminations. The cage formed by the bars 53 is at close concentric clearance from the outer orbits of the poles 25a and 25bb.

Assuming excitation of the field unit, upon relative rotation between the poles and the squirrel cage, the bars 53 of the cage cut the lines of flux extending from the poles, so that currents are induced in the squirrel cage. The action of these induced currents, and of flux induced in laminations 50, upon the magnetic fields at the poles 25aa and 25bb produces a linking or driving torque which influences the pole-carrying member to follow the squirrel-cage rotation. The linking torque is here due purely to induction in the squirrel cage and laminated carrier and not to magnetic drag resulting from eddy currents, eddy currents being effectively suppressed by use of the laminated carrier. The alternating or lapping arrangement of poles 25aa and 25bb in the second embodiment has the same advantages as in the first embodiment. As in the first embodiment, the circumferentially offset relation between poles 25aa and 25bb respectively in the two axially spaced-apart series results in extending magnetic field components in regularly alternating arcuate directions through the inductor member which involves in the second embodiment the laminations 50 and the squirrel cage including bars 53. To insure continuous distribution of the arcuate flux components to the laminations 50 even though the squirrel cage bars 53 are finitely spaced apart in circumferential direction, the poles 25aa and 25bb are interdigited. Such interdigiting is provided by symmetrical extensions 25'aa and 25'bb of the respective poles 25aa and 25bb, the extensions 25'aa reaching in axially parallel direction to positions between poles 25bb and the extensions 25'bb reaching similarly into positions between poles 25aa. The extensions are substantially thinner than the poles proper, and with the interdigited arrangement of the poles, approximately two-thirds of the available flux is extended from the poles proper to the inductor and about one-third from the interdigiting pole extensions. The poles 25aa and 25bb are here attached to spider 28 and web 27 substantially similar to the same designated elements of the first embodiment.

FIG. 7 shows a modification which permits use of a polar member of the same type as in the first embodiment, for coaction with the squirrel cage-lamination inductor. In this modification, the laminations are divided into two axially separated groups of laminations 60 and 61, at opposite sides of a non-magnetic spacer ring 63. Rimming the lamination groups and extending across from one group to the other is a magnetic steel collection ring 62 for distributing such flux as threads through the laminations, thus making an interdigited arrangement of poles on the polar member unnecessary.

FIG. 8 shows a modification of the composite inductor ring of the first embodiment. The coefficient of expansion of copper is higher than that of magnetic steel. Accordingly, heat generated during running of the clutch at high slip and high torque for extended periods tends to bulge the copper lining 15 and thereby effect distortion of the proper clearance between the copper lining and the pole faces. To prevent such distortion, the inductor in FIG. 8 is provided with machined magnetic steel bands 66 bonded to the inner face of the copper lining and surrounding the poles 25a and 25b. The bands 66 prevent bulging of any portion of the composite inductor ring in the region around the poles, and thus proper clearance between the inductor ring and the poles is maintained even when a large amount of heat is generated in the inductor ring.

While the invention has been disclosed in connection with the illustrated examples, changes may be made within the scope of the invention as indicated by the accompanying claims.

What is claimed is:

1. A magnetic slip clutch comprising coaxial driving and driven members one said member including two circularly arranged axially spaced arrays of magnetic flux concentrating poles, the two series having parallel orbits around the common axis of the driving and driven members, a field unit in symmetrical axial relation to the two arrays of poles to extend flux of one polarity to one array of poles and flux of relatively opposite polarity to the other array of poles, and the other of the coaxial members including a composite ring composed of a ferromagnetic cylindrical band magnetically coupling said spaced arrays and a low magnetically permeable low ohmic resistance facing for the ferromagnetic band having substantial inductive current carrying capacity, the composite ring also including axially spaced ferromagnetic hoops encircling said facing at surfaces opposite the surfaces of the facing engaged with the ferromagnetic band, said hoops being axially located in concentric clearance relation to the orbits of the axially spaced arrays of flux concentrating poles.

2. A clutch as in claim 1, said facing being comparatively of low thickness relative to the thickness of the ferromagnetic band.

3. A clutch as defined in claim 1, the facing being of rapid heat conducting material.

4. A clutch as defined in claim 3, the facing forming a lining for a peripheral face of the ferromagnetic band and having rim flanges forming an exterior lining for opposite ends of the ferromagnetic band.

5. A slip clutch comprising coaxial rotative driving and driven members, one said member including an inductor having a substantially cylindrical orbit, the other member being a pole-carrying member with two axially spaced series of poles supported at the sides so as to extend free in space, the two series having parallel outer orbits closely concentrically circumscribed by the inductor orbit, and a stationary field unit nested within the pole-carrying member and including a winding and a ferromagnetic core therefor coaxial with the driving and driven members and having a pair of circular sections respectively closely concentrically circumscribed by the inner orbits of the two series of poles, excitation of the field unit establishing a substantially toroidal magnetic field extended by the circular core sections to their respectively circumscribing series of poles and therefrom extended to the inductor to produce magnetic clutching force between the inductor and the poles upon relative rotation between the driving and driven members, said core being tubular and said circular sections being end sections of the core laminated to suppress eddy current drag of the field unit on the pole-carrying member, and a fixed bracket mounting the field unit and including an axial extension through the tubular core and composed of non-magnetic, metallic material to obviate diversion of flux from the core.

References Cited by the Examiner

UNITED STATES PATENTS

| | | | |
|---|---|---|---|
| 1,271,401 | 7/1918 | Weydell | 310—106 |
| 2,409,557 | 10/1946 | Gilfillan | 310—105 X |
| 2,428,104 | 9/1947 | Winther | 310—105 |
| 2,447,130 | 8/1948 | Matulaitis | 310—105 X |
| 2,484,138 | 10/1949 | Winther | 310—105 |
| 2,745,974 | 5/1956 | Oetzel | 310—105 X |
| 2,762,940 | 9/1956 | Hansen | 310—105 |
| 2,908,834 | 10/1959 | Munson | 310—105 |
| 3,076,109 | 1/1963 | Cohen | 310—105 |

FOREIGN PATENTS

| | | |
|---|---|---|
| 526,879 | 3/1954 | Belgium. |
| 401,019 | 7/1909 | France. |
| 553,908 | 6/1957 | Italy. |

ORIS L. RADER, *Primary Examiner.*

DAVID X. SLINEY, MILTON O. HIRSHFIELD,
*Examiners.*